US008384944B2

(12) United States Patent
Kawatoko et al.

(10) Patent No.: US 8,384,944 B2
(45) Date of Patent: Feb. 26, 2013

(54) PRINTING APPARATUS AND CONTROL METHOD WITH ADJUSTMENT UNIT CORRECTING THE DISPLACEMENT OF THE PRINT POSITION BY PIXEL UNIT, AND ANOTHER UNIT CORRECTING THE DISPLACEMENT BY THE UNIT SMALLER THAN THE PIXEL

(75) Inventors: Norihiro Kawatoko, Kawasaki (JP); Yuji Hamasaki, Kawasaki (JP); Atsushi Sakamoto, Kawasaki (JP); Aya Hayashi, Sendai (JP); Hidehiko Kanda, Yokohama (JP); Toshiyuki Chikuma, Kawasaki (JP); Jiro Moriyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 912 days.

(21) Appl. No.: 11/480,490

(22) Filed: Jul. 5, 2006

(65) Prior Publication Data

US 2007/0008361 A1 Jan. 11, 2007

(30) Foreign Application Priority Data

Jul. 8, 2005 (JP) ................................ 2005-200145

(51) Int. Cl.
*G06K 15/00* (2006.01)

(52) U.S. Cl. ..................... 358/1.18; 358/1.13; 358/1.14; 358/1.1; 347/1; 347/5; 347/9; 347/12; 347/41

(58) Field of Classification Search .......... 358/1.1–1.18; 347/1, 5, 9, 12, 41, 43
See application file for complete search history.

(56) References Cited

U.S. PATENT DOCUMENTS 5,956,055 A 9/1999 Gibson et al.
6,084,606 A 7/2000 Moriyama
(Continued)

FOREIGN PATENT DOCUMENTS

EP 0 674 993 A2 10/1995
JP 7-40551 2/1995
(Continued)

OTHER PUBLICATIONS

Yanaka Toshiyuki, Time Division Driving Method for Recording Device and Recording Head, Mar. 7, 2000, JP 2000071433.*

(Continued)

*Primary Examiner* — Benny Q Tieu
*Assistant Examiner* — Martin Mushambo
(74) *Attorney, Agent, or Firm* — Fitzpatrick, Cella, Harper & Scinto

(57) ABSTRACT

Provided is a print position control method whereby displacement of a print position in a wide range can be corrected very accurately, without reducing a printing speed or increasing a manufacturing cost. Thus, a printing apparatus includes: a first correction unit, for correcting a print position at accuracy equal to the resolution of the printing apparatus; and a second correction unit, for correcting the print position at accuracy higher than the resolution and in the range of an area that corresponds to one pixel of the resolution. With this arrangement, the print position displacement in a wide range equal to or greater than one pixel can be corrected by the first correction unit, and a print position displacement smaller than one pixel can be corrected by the second correction unit. Therefore, correction of a print position displacement in a wide range is enabled at a higher accuracy.

5 Claims, 16 Drawing Sheets

U.S. PATENT DOCUMENTS

| | | | | |
|---|---|---|---|---|
| 6,113,210 | A | 9/2000 | Gotoh et al. | |
| 6,426,765 | B1 * | 7/2002 | Iwasaki et al. | 347/12 |
| 6,913,337 | B2 | 7/2005 | Kuronuma et al. | |
| 7,306,306 | B2 | 12/2007 | Katsu et al. | |
| 2002/0030709 | A1 * | 3/2002 | Iwasaki et al. | 347/19 |
| 2004/0239746 | A1 * | 12/2004 | Ozawa et al. | 347/116 |
| 2005/0190213 | A1 * | 9/2005 | Katsu et al. | 347/5 |
| 2005/0200905 | A1 | 9/2005 | Kimura | |
| 2006/0038842 | A1 | 2/2006 | Chikuma et al. | |
| 2006/0098232 | A1 | 5/2006 | Nakano et al. | |
| 2006/0203074 | A1 | 9/2006 | Ishizaka | |
| 2007/0008360 | A1 | 1/2007 | Hayashi et al. | |
| 2007/0013726 | A1 | 1/2007 | Hayashi et al. | |
| 2007/0013732 | A1 | 1/2007 | Sakamoto et al. | |

FOREIGN PATENT DOCUMENTS

| | | | |
|---|---|---|---|
| JP | 7-309007 | | 11/1995 |
| JP | 10-044474 | A | 2/1998 |
| JP | 11-240143 | | 9/1999 |
| JP | 2001-260355 | A | 9/2001 |
| JP | 2004-9489 | | 1/2004 |
| JP | 2005-103820 | A | 4/2005 |
| JP | 2005-169733 | A | 6/2005 |
| JP | 2005-169784 | A | 6/2005 |

OTHER PUBLICATIONS

Office Action—Appln. No. 2005-200145, Japanese Patent Office, Nov. 26, 2010.

Communication—Japanese Patent Application No. 2005-200145, Japanese Patent Office, Jul. 29, 2011.

Office Action—Japanese Patent Appln. No. 2011-010318 dated Mar. 27, 2012, Japanese Patent Office.

* cited by examiner

PRIOR ART

PRIOR ART

PRIOR ART

FIG.12A

| | HEAD INCLINATION | | | | | | | | | |
|---|---|---|---|---|---|---|---|---|---|---|
| | 0 | | 1 | | 2 | | 3 | | 4 | |
| | NOZZLE SCHEMATIC DIAGRAM | ADJUSTMENT VALUE [1200dpi] | NOZZLE SCHEMATIC DIAGRAM | ADJUSTMENT VALUE [1200dpi] | NOZZLE SCHEMATIC DIAGRAM | ADJUSTMENT VALUE [1200dpi] | NOZZLE SCHEMATIC DIAGRAM | ADJUSTMENT VALUE [1200dpi] | NOZZLE SCHEMATIC DIAGRAM | ADJUSTMENT VALUE [1200dpi] |
| Seg_Block0 | | 0 | | 0 | | 0 | | 0 | | 0 |
| Seg_Block1 | | 0 | | 0 | | 1 | | 1 | | 1 |
| Seg_Block2 | | 0 | | 1 | | 1 | | 2 | | 3 |
| Seg_Block3 | | 0 | | 1 | | 2 | | 3 | | 4 |

600dpi

FIG.12B

| HEAD INCLINATION CORRECTION VALUE | | | | | | | | | | | |
|---|---|---|---|---|---|---|---|---|---|---|---|
| HEAD INCLINATION | | 0 | | 1 | | 2 | | 3 | | 4 | |
| RESOLUTION | | CORRECTION VALUE BY FIRST ADJUSTMENT UNIT | CORRECTION VALUE BY SECOND ADJUSTMENT UNIT | CORRECTION VALUE BY FIRST ADJUSTMENT UNIT | CORRECTION VALUE BY SECOND ADJUSTMENT UNIT | CORRECTION VALUE BY FIRST ADJUSTMENT UNIT | CORRECTION VALUE BY SECOND ADJUSTMENT UNIT | CORRECTION VALUE BY FIRST ADJUSTMENT UNIT | CORRECTION VALUE BY SECOND ADJUSTMENT UNIT | CORRECTION VALUE BY FIRST ADJUSTMENT UNIT | CORRECTION VALUE BY SECOND ADJUSTMENT UNIT |
| Seg_ Block No. | 0 | 0 | 0 | 0 | 0 | 0 | 0 | 0 | 0 | 0 | 0 |
| | 1 | 0 | 0 | 0 | 0 | 0 | 1 | 0 | 1 | 0 | 1 |
| | 2 | 0 | 0 | 0 | 1 | 0 | 1 | 1 | 0 | 1 | 1 |
| | 3 | 0 | 0 | 0 | 1 | 1 | 0 | 1 | 1 | 2 | 0 |

FIG.14A

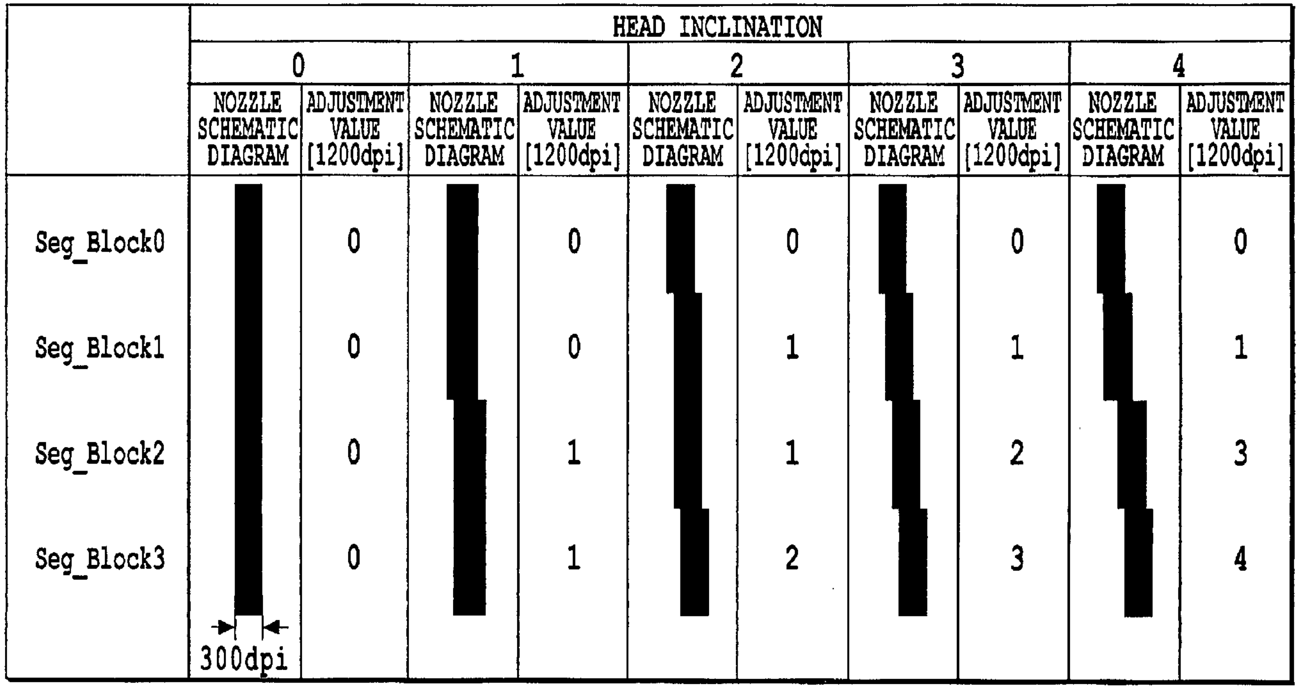

FIG.14B

| HEAD INCLINATION CORRECTION VALUE | | | | | | | | | | | |
|---|---|---|---|---|---|---|---|---|---|---|---|
| HEAD INCLINATION | | 0 | | 1 | | 2 | | 3 | | 4 | |
| RESOLUTION | | CORRECTION VALUE BY FIRST ADJUSTMENT UNIT | CORRECTION VALUE BY SECOND ADJUSTMENT UNIT | CORRECTION VALUE BY FIRST ADJUSTMENT UNIT | CORRECTION VALUE BY SECOND ADJUSTMENT UNIT | CORRECTION VALUE BY FIRST ADJUSTMENT UNIT | CORRECTION VALUE BY SECOND ADJUSTMENT UNIT | CORRECTION VALUE BY FIRST ADJUSTMENT UNIT | CORRECTION VALUE BY SECOND ADJUSTMENT UNIT | CORRECTION VALUE BY FIRST ADJUSTMENT UNIT | CORRECTION VALUE BY SECOND ADJUSTMENT UNIT |
| Seg_ Block No. | 0 | 0 | 0 | 0 | 0 | 0 | 0 | 0 | 0 | 0 | 0 |
| | 1 | 0 | 0 | 0 | 0 | 0 | 1 | 0 | 1 | 0 | 1 |
| | 2 | 0 | 0 | 0 | 1 | 0 | 1 | 0 | 2 | 0 | 3 |
| | 3 | 0 | 0 | 0 | 1 | 0 | 2 | 0 | 3 | 1 | 0 |

PRINTING APPARATUS AND CONTROL METHOD WITH ADJUSTMENT UNIT CORRECTING THE DISPLACEMENT OF THE PRINT POSITION BY PIXEL UNIT, AND ANOTHER UNIT CORRECTING THE DISPLACEMENT BY THE UNIT SMALLER THAN THE PIXEL

BACKGROUND OF THE INVENTION

1. Field of the Invention

The present invention relates to a printing apparatus wherein a printing unit, in which a plurality of printing elements are arranged, provides a printing agent for a printing medium to form an image. The present invention relates particularly to a method and a configuration for adjusting the displacement of print position for printing elements.

2. Description of the Related Art

Printing apparatuses having some function of a printer, a copiers and a facsimile, or printing apparatuses employed as the output apparatuses for multifunctional electronic apparatuses that include a computer or a word processor and for workstations employ image information (including, for example, character information) to print images (including characters and like) on printing media, such as paper and plastic thin sheets. The printing methods of the printing apparatuses can be categorized as being inkjet, wire dot, thermal and laser beam types. The printing apparatus of an inkjet type (an inkjet printing apparatus) permits a printing unit (printing head) to eject ink onto a printing medium for printing images. Compared with other printing types, inkjet printing apparatuses have several superior features, in that high definition printing is easily provided and fast printing is performed in a superior, noiseless state, and in that such apparatuses are inexpensive. Therefore, the employment of inkjet printing apparatuses has spread and currently covers a wide range, from office use to personal use.

Generally, inkjet printing apparatuses employ printing heads wherein ink discharge ports and a plurality of printing elements, including liquid paths for supplying ink to the ink discharge ports, are arranged. Further, in order to cope with color printing, inkjet printing apparatuses are frequently equipped with printing heads for multiple colors.

Generally, inkjet printing apparatuses are categorized as being either serial printing types or line printing types, depending on the different printing operations that can be performed. To form an image, a serial type printing apparatus intermittently repeats a main scanning operation, according to which the printing head is moved relative to a printing medium to form an image, and a sub-scanning operation, according to which a printing medium is conveyed in a direction perpendicular to the main scanning direction. Whereas for a line type printing apparatus, an immobile printing head is used, wherein multiple printing elements are arranged in consonance with a printing width for a printing medium. To form an image, while the printing head performing print operation, the printing medium is moved at a predetermined speed in a direction different from the direction in which the printing elements are arranged.

Although the line type printing apparatus can perform printing rapidly, such an apparatus tends to be large. On the other hand, the serial type printing apparatus employs a small printing head and is to cope with various printing media sizes. When the number of times scanning is performed, or the main scanning direction relative to an image area is changed, various printing speeds and image qualities can be provided that are in consonance with the desires of a user. Therefore, recently, widespread use is being made of the serial type inkjet printing apparatus, especially for the personal use.

However, the serial type inkjet printing apparatus also has an inherent problem.

FIGS. 1A and 1B are schematic diagrams for explaining an example manufacturing error for a printing head that is to be mounted on an inkjet printing apparatus. In FIGS. 1A and 1B, a printing head 1401 is formed by adhering to the printing head 1401 a plurality of chips 1402 that include a plurality of discharge ports 1403 for discharging ink. In the example in FIG. 1A, an ideal printing head manufactured with no error is shown. In the example in FIG. 1B, the chips 1402 are obliquely adhered to the printing head 1401. To perform printing, in accordance with an image signal, the individual discharge ports 1403 of the printing head 1401 discharge ink at a predetermined frequency, and are moved at a constant speed in the main scanning direction shown in FIGS. 1A and 1B. When one scanning is completed, a printing medium is conveyed in the sub-scanning direction shown in FIGS. 1A and 1B a distance equivalent to the printing width of the printing head.

FIGS. 2A and 2B are diagrams for explaining a printed image problem that is encountered when the printing head having the above described tilt is employed. In this case, the printing of ruled lines extended in the sub-scanning direction is shown. When discharge ports 1403 arranged on a printing head 1401 are not tilted, and when printing has been normally performed, straight ruled lines extended in the sub-scanning direction, as shown in FIG. 2A, are printed. On the other hand, when the individual chips 1402 are tilted as shown in FIG. 1B, ruled lines are obliquely printed during scanning, and are split into segments at the seams of the lines when sequential scanning is performed.

This occurrence of this phenomenon not, however, due only to the tilting of the printing head relative to the main body of the printing apparatus. During the manufacture of a printing head and a printing apparatus, specific errors must be taken into account, but various other discrepancies are also often found in the print results. The phenomenon shown in FIG. 2B, wherein ruled lines are tilted, can also occur due to various other factors, such as the inclination of the discharge face of the printing head relative to the face of a printing medium, the inclination of the printing element arrays on the printing head and variances in the discharge speeds of ink droplets discharged from the individual printing element.

FIGS. 3A to 3C are schematic diagrams for explaining an example wherein the shifting of a ruled line, as shown in FIG. 2B, occurs due to the inclination of the discharge port face of a printing head relative to the face of a printing medium. In the state in FIG. 3A, a printing head 1401 is not tilted relative to a printing medium 1503. In FIG. 3A, a carriage 1506, on which the printing head 1401 is mounted, is moved vertically to this drawing, relative to the printing medium 1503, along a carriage shaft 1507. As the carriage 1506 is moved, the printing head 1401 discharges ink droplets at a constant timing. While referring to the state shown in FIG. 3A, since the discharge port face of the printing head 1401 is parallel to the printing medium 1503, the distance between the printing medium 1503 and each of the discharge ports arranged on the discharge port face is identical. Thus, ink droplets discharged at the same timing land on to the printing medium 1503 at substantially the same time. That is, in FIG. 3A, both an ink droplet 1501, discharged from the leftmost discharge port, and an ink droplet 1502, discharged from the rightmost discharge port, land on the printing medium 1503 at almost the same time, and as indicated by a broken line 1504 in FIG. 3C, a ruled line parallel to the sub-scanning direction is printed.

In the state in FIG. 3B, the attached carriage 1506 is tilted at the carriage shaft 1507. In this case, the discharge port face of the printing head is also inclined relative to the printing medium 1503, and the distance between the printing medium 1503 and each of the discharge ports arranged on the discharge port face differs. That is, in FIG. 3B, an ink droplet 1501 discharged from the leftmost discharge port lands on the printing medium 1503 later than an ink droplet 1502 discharged from the rightmost discharge port. Since the carriage 1506 is moved vertically relative to this drawing, during the discharge operation, the differences in the landing timing appear as an inclination indicated by a broken line 1505 in FIG. 3C, just as if the discharge port array were tilted.

FIG. 4 is a schematic diagram for explaining an example wherein shifting within a ruled line, as shown in FIG. 2B, occurs due to the speed at which ink is discharged from individual discharge ports. A plurality of printing elements are arranged in a printing head under the same conditions; however, specific discrepancies may be present in the consumption of the driving power by the individual printing elements, and in members provided in the printing elements. These discrepancies may appear as differences in the discharge speed when ink is discharged from the discharge ports of the printing elements. In FIG. 4, the speed at which an ink droplet 1601 is discharged from the leftmost discharge port is the lowest, and gradually increases, discharge port by discharge port to the right. In this case, the ink droplet 1601, discharged from the leftmost discharge port, lands on a printing medium 1503 later than an ink droplet 1602, discharged from the rightmost discharge port. Since a carriage 1401 is moved vertically relative to this drawing, during the discharge operation, the difference in the landing timing appears as a difference, as indicated by the broken line 1505 in FIG. 3C, just as if the discharge port array were tilted.

As described above, and as shown in FIGS. 1A to 4, a printed ruled line can be tilted due to various reasons. Further, such differences in the print positions constitute a new image barrier for various situations, in addition to the printing of the ruled lines shown in FIG. 2B.

For example, for the serial type inkjet printing apparatus, a multi-pass printing method is sometimes employed in order to reduce a seam that appears at each scanning, or to reduce an uneven density that is caused by variances in the manufacture of discharge ports. According to the multi-pass printing method, data to be printed in one image area is divided into a plurality of patterns that are in complementary relationship each other, and an image is formed step by step by performing a plurality of scans. Since before and after each scan a printing medium is conveyed a distance that is shorter than the printing width of a printing head, a line is formed in the main scanning direction by a plurality of types of printing elements. Thus, the printing characteristics of the individual printing elements are dispersed across the entire image, and the entire image is smoothed.

However, when the above described tilt is present, even though the multi-pass printing method is employed, a displacement may occur in dot position to be complemented each scan, and a new image barrier, such as improper texture, may be the result.

Furthermore, for a printing apparatus wherein a plurality of printing heads are arranged for printing a color image, the degree of tilt may differ, depending on the printing heads. Because of this, color would be applied unevenly, or granularity deterioration (visual roughness of grains) would occur.

As described above, an image barrier due to tilting is a conventionally important problem for a serial inkjet printing apparatus. To resolve the problem occurring due to tilting, several measures have been proposed and applied.

For example, in Japanese Patent Application Laid-open No. 7-309007 (1995), disclosed is an inkjet printing system that includes an error correction circuit that adds an offset to image data printed by individual discharge ports, so as to reduce a print position error that is caused by the rotation of a printing head. Further, in Japanese Patent Application Laid-open No. 7-040551 (1995), an inkjet printing apparatus is disclosed wherein a plurality of discharge ports arranged in a printing head are divided into a plurality of blocks, and the order in which ink is discharged from the blocks and the discharge interval are controlled in accordance with the tilting of a printing head. In addition, in Japanese Patent Application Laid-open No. 11-240143 (1999), in order to correct a shift in print positions that occurs at a seam for scans, due to the tilting of a printing head, disclosed is a method whereby an offset value is designated based on a difference between a print position for the topmost discharge port and a print position for the lowermost discharge port, and whereby, through part of the discharge ports, data are printed by being shifted a distance equivalent to the offset value. Moreover, in Japanese Patent Application Laid-open No. 2004-009489, disclosed is an inkjet printing apparatus that includes means for changing, in accordance with the tilt of a printing head, the allocation of print data to individual discharge ports.

However, by using the methods described in the patent documents described above, wither the above described problems can not be satisfactorily resolved or a new another problem has arisen, and practical tilting correction is not ensured.

For example, in order to correct an error due to a tilt, in Japanese Patent Application Laid-open No. 7-309007 (1995), an inkjet printing system is disclosed wherein a printing head is divided into two or more nozzle groups (discharge port groups), and wherein the second nozzle group is offset relative to the first nozzle group, i.e., the timing is adjusted to perform printing. To provide the offset, a "method for generating a drive signal for discharging ink from the second nozzle group later (or earlier) than that for the first nozzle group" and a method "for generating data to be printed by the second nozzle group while an address is shifted" are disclosed in the embodiment. However, according to the first method, since drive signal transmission means for the individual nozzle groups is required, costs are increased, and the limit "the maximum value for a shift is dependent on the input of a data signal for an adjacent pixel" is also additionally provided. According to the second method, no limitations are imposed for the shift, however, when an accurate correction is to be performed, a higher resolution must be set for data to be printed, and the amount of image data required would be enormous.

In Japanese Patent Application Laid-open No. 7-040551 (1995), a method is disclosed whereby, by employing the fact that nozzles of one nozzle array are divided into a plurality of blocks for discharging ink, the order driving blocks are arranged in accordance with a tilt, and the intervals for the driving blocks are changed. However, according to this method, as well as the method disclosed in Japanese Patent Laid-Open Publication No. 7-309007, the limitation that "the maximum value for a shift is dependant on the input of a data signal for an adjacent pixel" is additionally provided. Therefore, the correctable range is limited to only a single pixel.

In Japanese Patent Application Laid-open No. 11-240143 (1999), a method is disclosed, whereby, between scans, the level of a tilt is identified based on the difference between the print positions of the distal end nozzle and the rear end nozzle, and in accordance with the difference, data is printed through part of the nozzles, while offset. Furthermore, in Japanese Patent Application Laid-open No. 2004-009489, a method is disclosed whereby data to be allocated to individual nozzles vary in accordance with the tilting level of a printing head. However, using either of the methods disclosed in Japanese Patent Application Laid-open Nos. 11-240143 (1999) and 2004-009489, corrections can only be performed at accuracy equal to a unit of a single pixel.

That is, when any methods disclosed in the above described patent documents are employed, direct means for correcting the tilt either adjusts, within one pixel, a timing for driving individual printing elements (nozzles), or shifts, by one pixel unit, the address of data to be printed. The first means can not cope with a displacement of one pixel or greater, and the second means can correct the tilt with an accuracy equal only to a single pixel unit. For the second means, the method for increasing the printing resolution may be employed to reduce the size of a single pixel. However, when the printing resolution is increased and exceeds a requested image quality, the volume of the image data required would be expanded, the printing speed would be reduced, and the cost of the printing apparatus would be increased. Thus, this is not a practical method.

SUMMARY OF THE INVENTION

In order to resolve the above described shortcomings, one objective of the present invention is to provide an inkjet printing apparatus wherein the tilt of a printing head, within a wide range, can be correct with high accuracy, without causing a reduction in printing speed and an increase in cost, and a control method for the inkjet printing apparatus.

In the first aspect of the present invention, there is provided a printing apparatus, which moves a printing element array relative to a printing medium and prints for a plurality pixel on the printing medium: the printing element array being configured by dividing a plurality of printing element providing a color agent into a plurality of printing element group, comprising: first correction means, for correcting a displacement of print position by one pixel unit; second correction means, for correcting a displacement of print position by an unit smaller than one pixel, and determination means, for determining a correction value for the first correction means and a correction value for the second correction means for each group, according to an inclination of print position of the printing element array.

In the second aspect of the present invention, there is provided a print position control method, for a printing apparatus that moves a printing element array relative to a printing medium and prints for a plurality pixel on the printing medium: the printing element array being configured by dividing a plurality of printing element providing a color agent into a plurality of printing element group, comprising: first correction step of correcting a displacement of print position by one pixel unit; second correction step of correcting a displacement of print position by an unit smaller than one pixel, and determination step of determining a correction value for the first correction means and a correction value for the second correction means for each group, according to an inclination of print position of the printing element array.

The above and other objects, effects, features and advantages of the present invention will become more apparent from the following description of embodiments thereof taken in conjunction with the accompanying drawings.

BRIEF DESCRIPTION OF THE DRAWINGS

FIGS. 12A and 12B are diagrams for explaining the levels of the inclination of the discharge port array in the first embodiment, and adjustment values corresponding to the levels;

FIGS. 14A and 14B are diagrams for explaining the levels of the inclination of the discharge port array in the second embodiment, and adjustment values corresponding to the levels;

DETAILED DESCRIPTION OF PREFERRED EMBODIMENTS

The preferred embodiments of the present invention will now be described while referring to the accompanying drawings.

(Basic Configuration of an Inkjet Printing Apparatus)

Figure 1A:
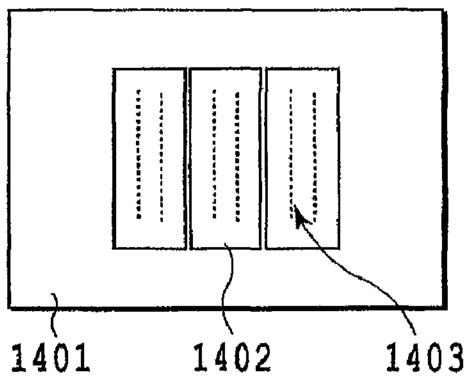
PRIOR ART FIG.1A
FIGS. 1A and 1B are schematic diagrams for explaining an example manufacturing error of a printing head to be mounted on an inkjet printing apparatus.
Figure 1B:
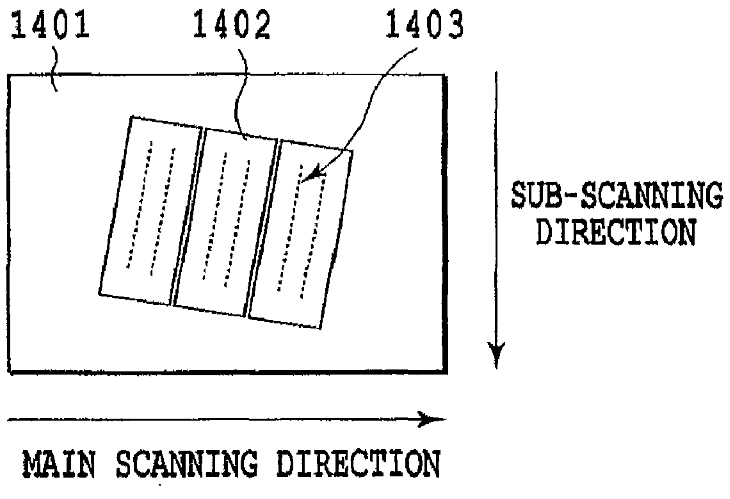
Figure 2A:
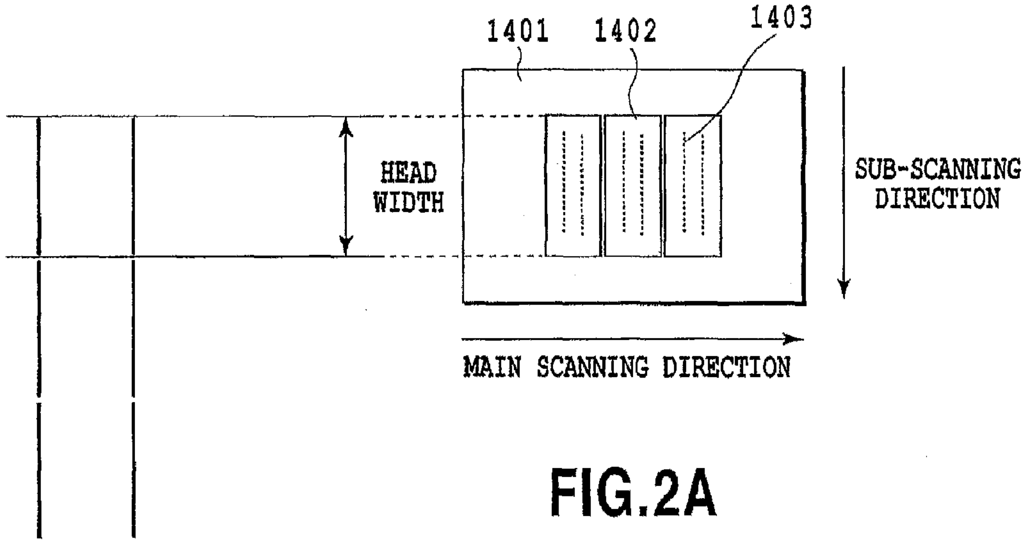
FIGS. 2A and 2B are diagrams for explaining a problem on an image printed by using a tilted printing head.
Figure 2B:
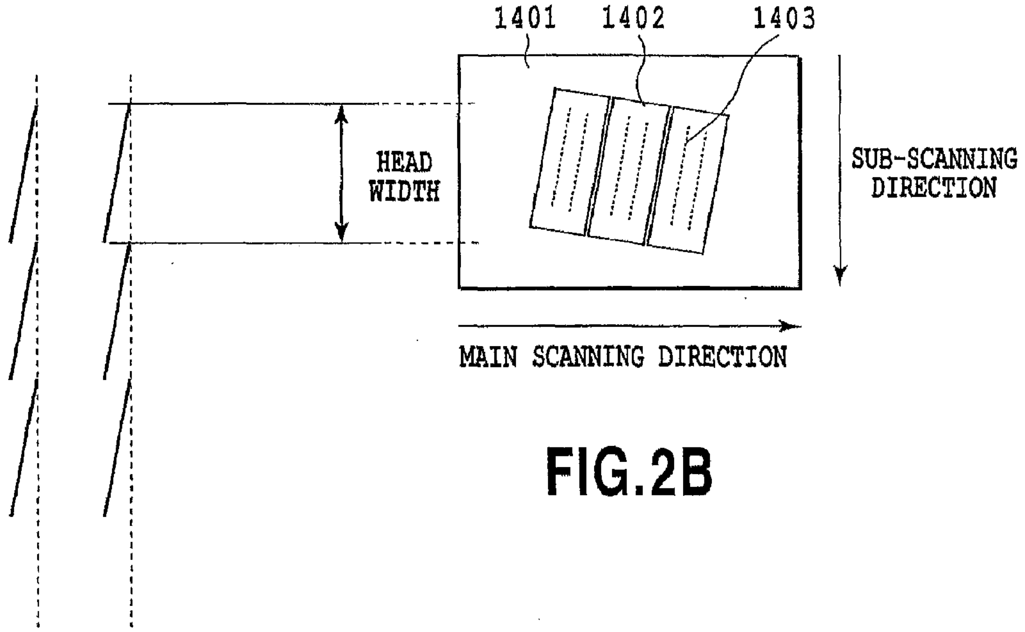
Figure 3A:
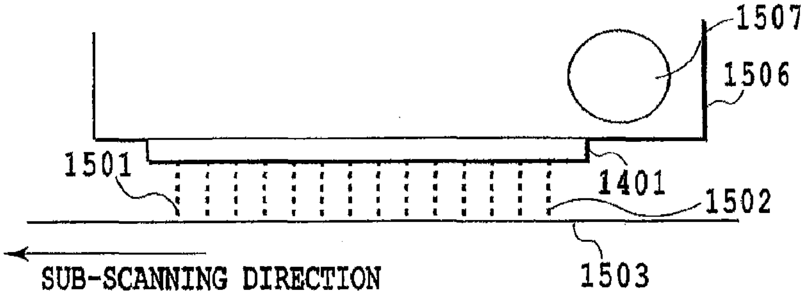
FIGS. 3A to 3C are schematic diagrams for explaining an example wherein a shift occurs in a ruled line due to the inclination of the discharge port face of a printing head relative to the face of a printing medium.
Figure 3B:
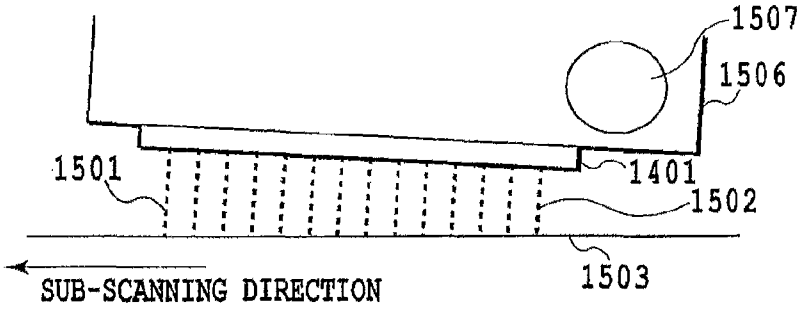
Figure 3C:
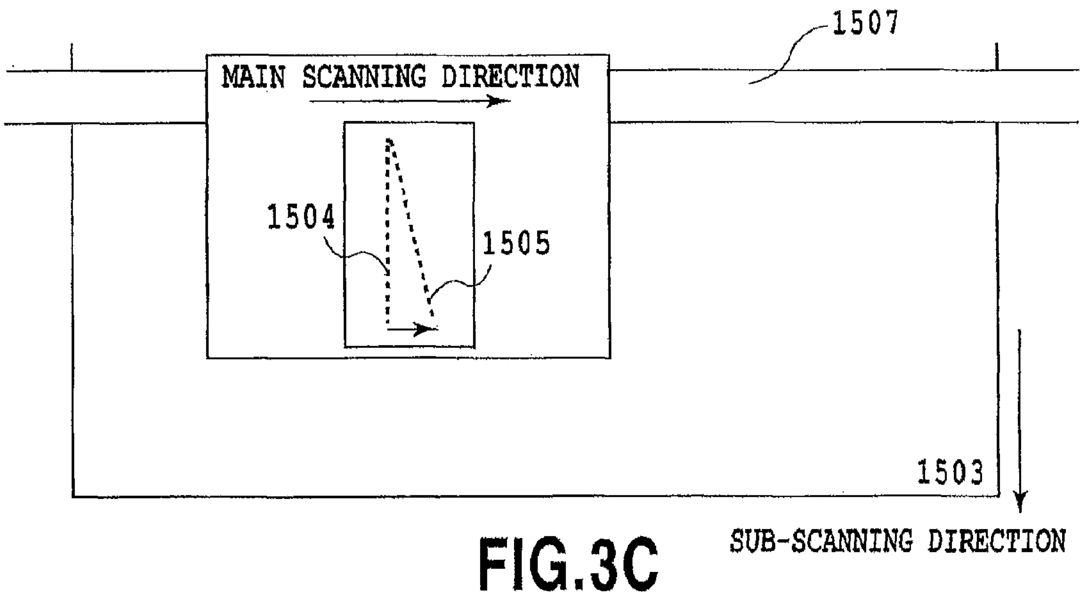
Figure 4:
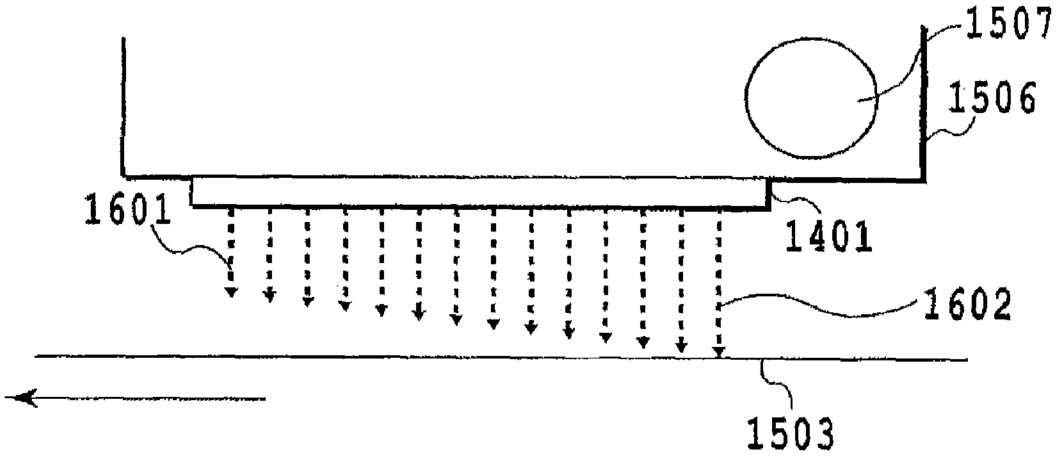
FIG. 4 is a schematic diagram for explaining an example wherein a shift occurs in a ruled line due to the speeds for discharging ink from individual discharge ports.
Figure 5:
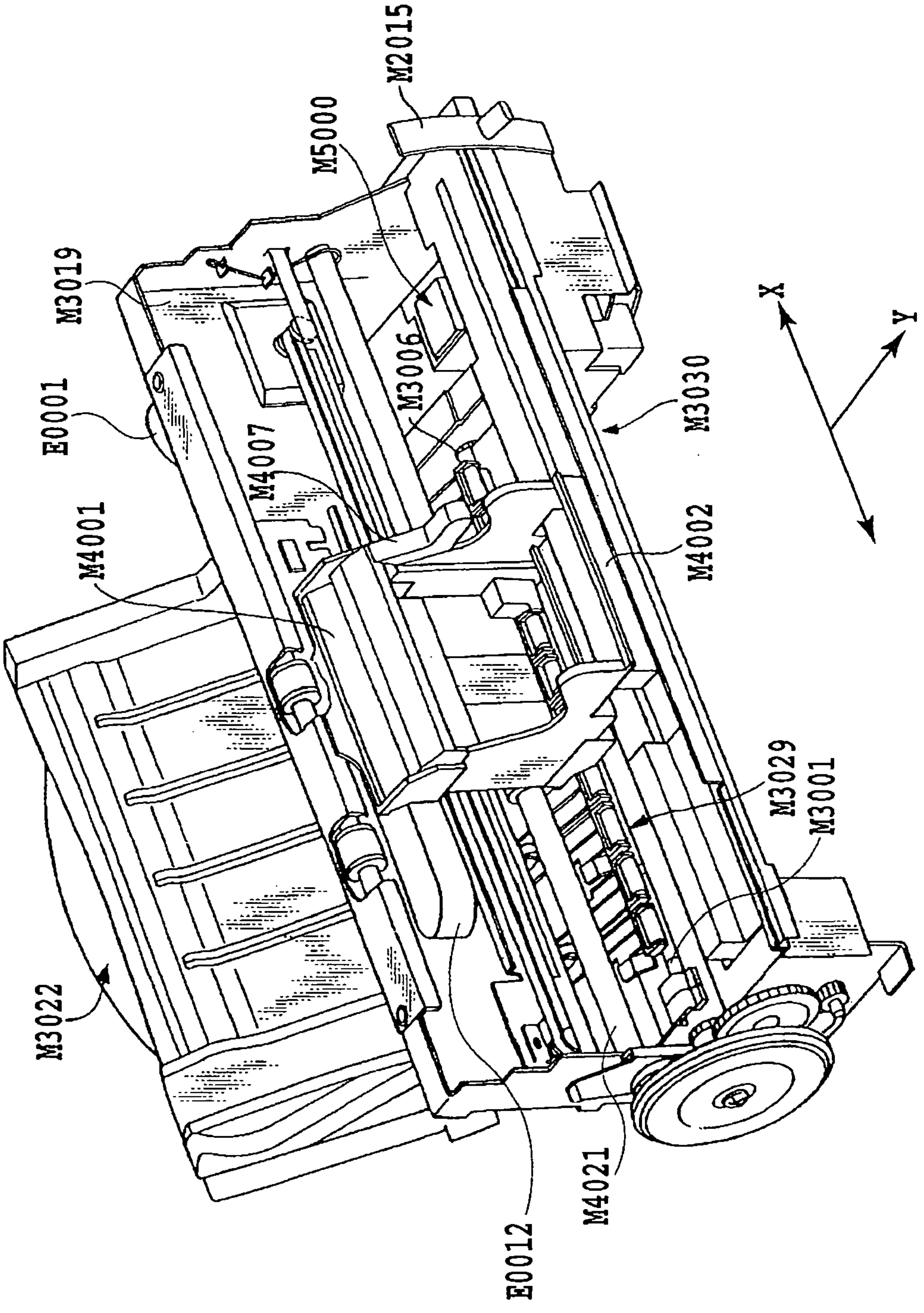
FIG. 5 is a schematic configuration diagram for explaining the essential portion of an inkjet printing apparatus for which the present invention can be applied.

FIG. 5 is a schematic configuration diagram for explaining the essential portion of an inkjet printing apparatus for which the present invention can be applied. In FIG. 5, a chassis M3019, stored in the external member of an inkjet printing apparatus, is formed of a plurality of metal plate members having a predetermined rigidity, and serves as the framework of the inkjet printing apparatus to support the following printing mechanisms. An automatic feeding unit M3022 automatically supplies a sheet (printing medium) to the main body of the apparatus. When a printing medium is supplied, one sheet at a time, by the automatic feeding unit M3022, a conveying unit M3029 guides the printing medium to a predetermined print position in accordance with the rotation of an LF roller M3001, and also conveys the printing medium from the print position to a delivery unit M3030. An arrow Y indicates a direction (sub-scanning direction) in which a printing medium is conveyed. A printing unit performs desired printing on the printing medium located at the print position. Further, a recovery unit M5000 performs a recovery process for the printing unit. An sheet gap adjustment lever M2015 is used to adjust, step by step, a distance (hereinafter referred to as a sheet gap) between the discharge port face of a printing head and a printing medium, and a bearing M3006 is provided for the LF roller M3001.

When a carriage motor E0001 is driven, a carriage M4001 can be moved along a carriage shaft M4021 in the main scanning direction indicated by an arrow X. Further, a printing head H1001 (see FIG. 6) of inkjet type that can discharge ink is detachably mounted to the carriage M4001.

Figure 6:
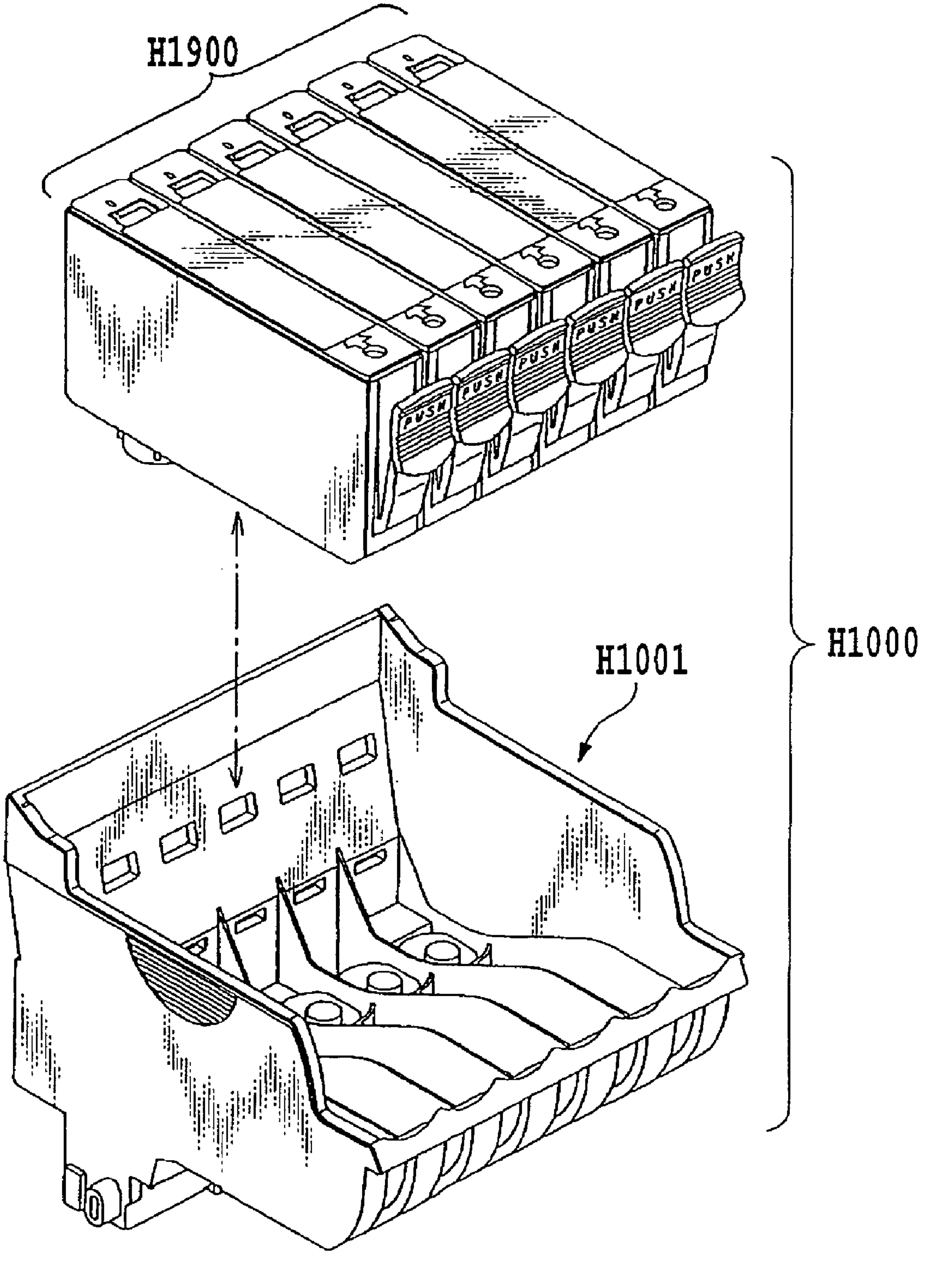
FIG. 6 is a diagram showing the state wherein ink tanks for a plurality of colors are to be mounted to a printing head.

In the state in FIG. 6, ink tanks H1900 for a plurality of colors are to be mounted to the printing head H1001. In this embodiment, the printing head H1001 and the ink tanks H1900 of six colors constitute a printing head cartridge H1000. In order to enable photographic color printing with a high image quality, black, light cyan, light magenta, cyan, magenta and yellow ink tanks H1900 are separately prepared. The ink tanks H1900 are detachable to the printing head H1001 respectively, and from the ink tanks H1900, ink to be consumed for printing is supplied to the printing head H1001.

Referring again to FIG. 5, when the printing head cartridge H1000 is attached to the carriage M4001, a head drive signal required for printing is transmitted to the printing head H1001 via a flexible cable E0012 connected to a main board (not shown). An arbitrary method can be employed for discharging ink from individual printing elements arranged in a printing head, and for the printing head H1001 in this embodiment, an electrothermal converter is arranged in each printing elements. When a drive signal is transmitted as a voltage pulse to the electrothermal converter, the electrothermal converter drastically generate heat, and film boiling occurs in ink that contact the converter. Thus, by energy exerted as bubbles are growing, ink is discharged via the discharge port.

The recovery unit M5000 includes a cap (not shown) that closes the face of the printing head H1001 where the ink discharge ports are formed. A suction pump may be connected to the cap so as to introduce a negative pressure inside. In this case, a negative pressure is introduced inside the cap that covers the ink discharge ports of the printing head H1001, and ink is removed from the ink discharge ports by suction. In this manner, the recovery process (or also called a "suction recovery process") can be performed in order to maintain a preferable ink discharge state of the printing head H1001. Further, inside the cap, ink that is not used for image printing may be discharged from the ink discharge ports. In this manner, a recovery process (also called a "discharge recovery process") can be performed to maintain a preferable ink discharge state of the printing head H1001.

A carriage cover M4002, for guiding the printing head H1001 to a predetermined mounting position, is provided for the carriage M4001. Further, for the carriage M4001, a head set lever M4007 is provided that engages the tank holder of the printing head H1001 in order to set the printing head H1001 at a predetermined mounting position. The head set lever M4007 is located rotatably at the head set lever shaft that is positioned above the carriage M4001, and a head set plate (not shown) that is urged by a spring is provided for the portion of the head set lever M4007 that engages the printing head H1001. By the force of the spring, the head set lever M4007 is mounted to the carriage M4001 while pressing the printing head H1001.

Figure 7:
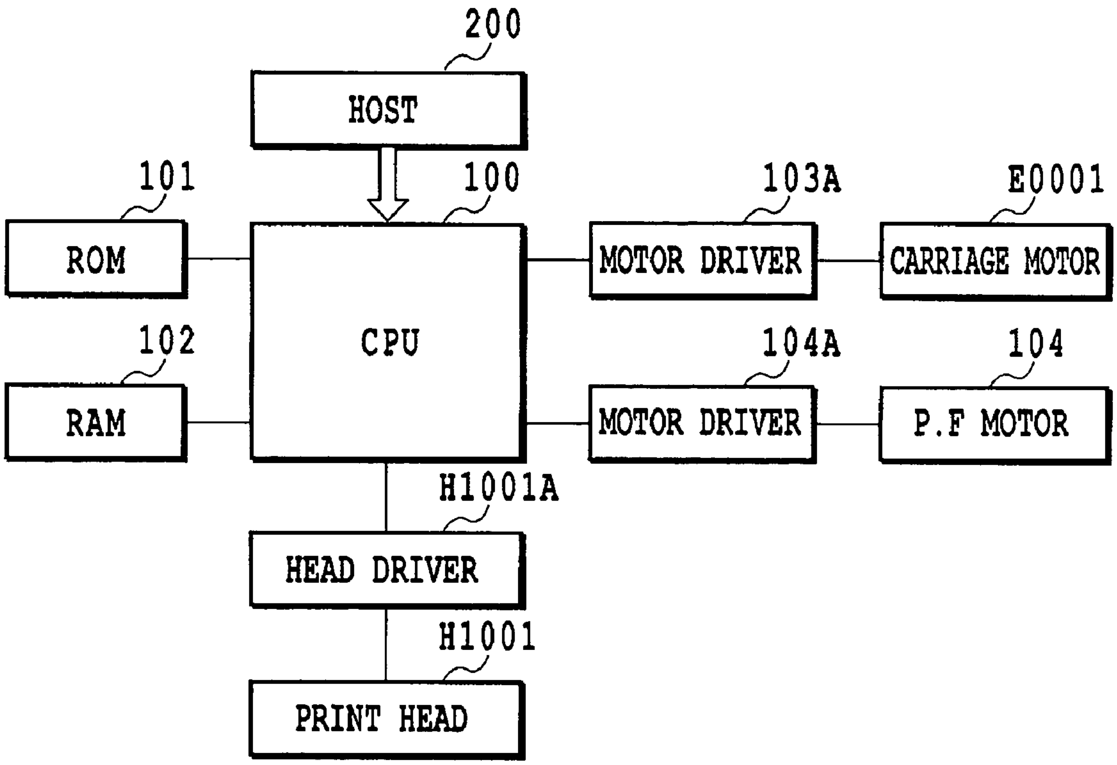
FIG. 7 is a block diagram for explaining the arrangement of the control system of the inkjet printing apparatus.

FIG. 7 is a block diagram for explaining the arrangement of the control system of the inkjet printing apparatus. In FIG. 7, a CPU 100 performs the control process and the data process to operate the inkjet printing apparatus. A ROM 101 is used to store programs for these processes, and a RAM 102 is used as a work area to perform the processes. For discharging ink by the printing head H1001, the CPU 100 supplies, to a head driver H1001A, drive data (print data) and a drive control signal (heat pulse signal) to be transmitted to the electrothermal converters. The CPU 100 controls the carriage motor E0001 via a motor driver 103A in order to drive the carriage M4001 in the main scanning direction. Further, the CPU 100 controls a P.F motor 104 via a motor driver 104A in order to convey a printing medium in the main scanning direction.

When the thus arranged inkjet printing apparatus performs printing, the CPU 100 temporarily stores, in a print buffer of the RAM 102, print data that are received from a host 200 via an external I/F. Then, the CPU 100 permits the carriage motor E0001 to move the carriage M4001 and the printing head H1001 in the main scanning direction, and transmits a drive signal to the head driver H1001A based on the print data. When one main scan is ended, the CPU 100 permits the P. F motor 104 to convey the printing medium at a predetermined distance. By repeating the main scanning and conveying, print data stored in the print buffer are sequentially printed on the printing medium.

Figure 8:
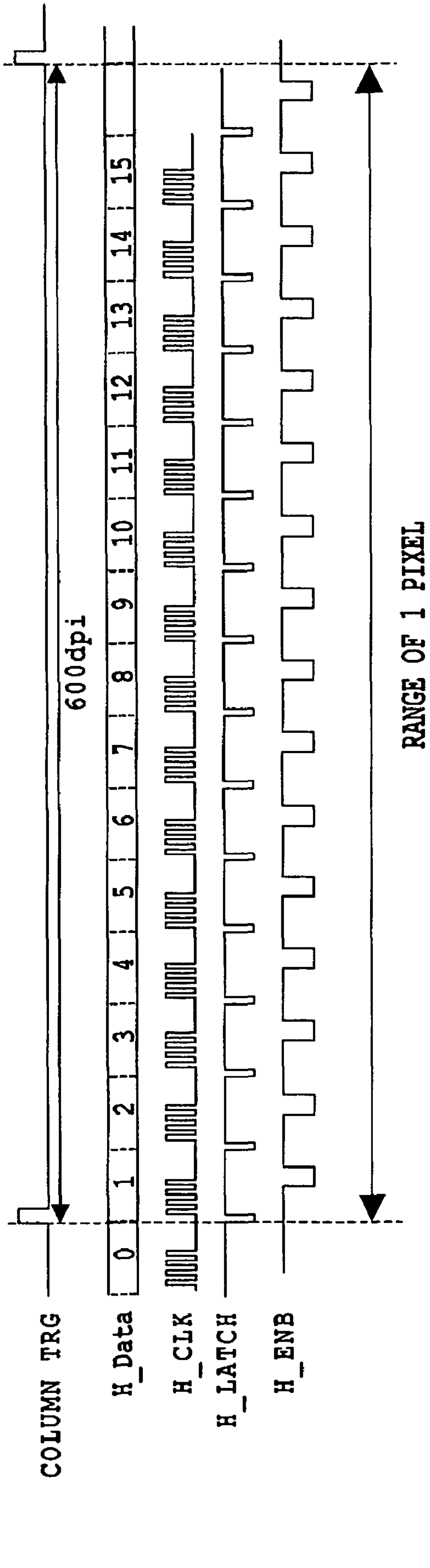
FIG. 8 is a timing chart for explaining a plurality of types of pulse signals to be generally input to the printing head.

FIG. 8 is a timing chart for explaining a plurality of types of pulse signals that are generally received by the printing head H1001 of the above described inkjet printing apparatus. The printing head H1001 in this invention can perform printing at a resolution of 600 dpi (dot/inch) in the main scanning direction. In FIG. 8, a plurality of types of pulse signals are shown so as to be generated within a period consonant with one pixel (hereinafter referred to as one column) of the resolution.

Referring to FIG. 8, COLUMN TRG indicates a signal internally generated by the inkjet printing apparatus, and a period consonant with one column is defined in accordance with the pulse generation interval. The pulse generation interval of COLUMN TRG can be adjusted depending on the resolution of an image and the moving speed of a carriage. In this invention, since printing is performed at the resolution of 600 dpi, the traveling distance of the carriage per one column is 1/600 inches.

H_LATCH, H_CLK, H_Data and H_ENB are drive signals for discharging ink from the printing head H1001. In this invention, one column is time-divided into 16 blocks as indicated 0 to 15, and the individual printing element perform printing at any block timings, in one pixel. In accordance with a transfer clock H_CLK, H_Data is transferred to a shift register prepared in the printing head H1001, and is latched at the trailing edge of H_LATCH. Based on the latched drive data H_Data, ink is discharged at the heat pulse H_ENB in the next block. In this case, the heat pulse H_ENB actually serves as a voltage pulse to be applied to the individual electrothermal converters. While the application of the heat pulse is performed, the next drive data are transferred.

The timing chart shown here is the one generally employed, and is to be referred to as a comparison example for the embodiments of the present invention that will be described below.

First Embodiment

An explanation will now be given for specific embodiments of the present invention where the above described inkjet printing apparatus is employed.

Figure 9:
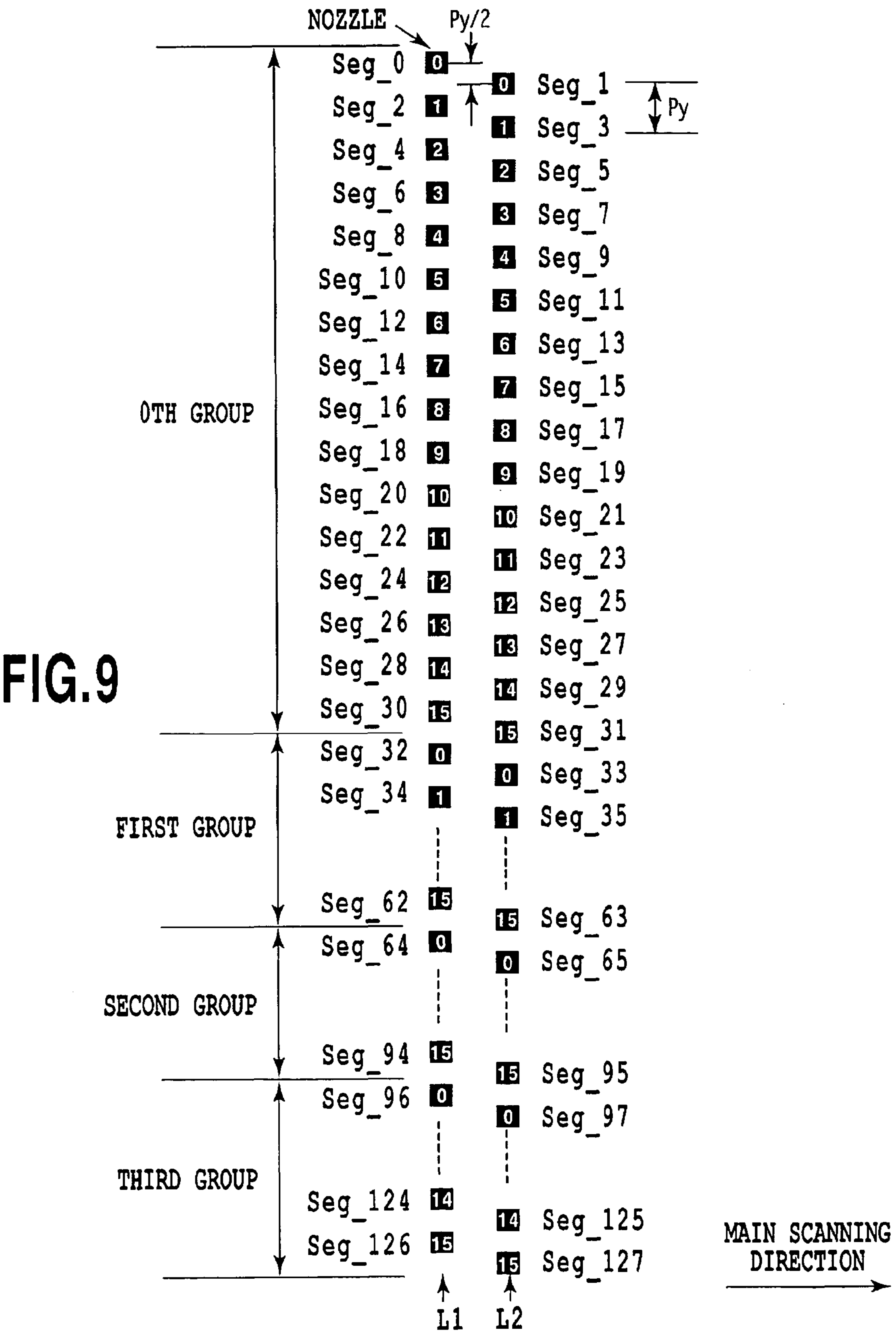
FIG. 9 is a diagram for explaining the state of the inkjet printing head for the present invention wherein the discharge ports of individual printing elements are arranged.

FIG. 9 is a diagram for explaining the state of an inkjet printing head for a first embodiment of the invention wherein discharge ports of printing elements are arranged. For the printing head of this embodiment, two discharge port arrays L1 and L2 are arranged to discharge one color ink, and in FIG. 9, black squares indicate discharge ports included in the individual arrays. To form one discharge port array, 64 discharge ports are arranged at a pitch Py of 1/300 inches in the sub-scanning direction, and two discharge port arrays are shifted by a distance Py/2 from each other in the sub-scanning direction. When this printing head is moved in the main scanning direction and discharges ink at a predetermined timing, an image can be printed at a printing density of 600 dpi in the sub-scanning direction. For the convenience sake of the explanation, printing elements consonant with 128 discharge ports are denoted by Seg_0 to Seg_127.

In FIG. 9, numerals in black squares are the numbers of blocks to which the printing elements belong. That is, the printing elements having the same block numbers are driven at the same timing in one column. For example, eight printing elements have a block number 0, i.e., there are Seg_0, Seg_1, Seg_32, Seg_33, Seg_64, Seg_65, Seg_96 and Seg_97, and these printing elements are arranged, by twos, at every 32 elements (or one at a time every 16 elements on each array). The same thing is applied for the other 15 block numbers. For a recent printing head wherein printing elements are arranged at a high density, it is confirmed that there is a trend that the ink discharge operations of the individual printing elements affect adjacent printing elements. Therefore, it is effective that printing elements to be driven at the same time are dispersed on the same discharge port array, so that the discharge operations of the individual printing elements can be stabilized.

For the above described block division, printing elements that are adjacent to each other and that have different block numbers can be sorted into groups. That is, in this embodiment, Seg_0 to Seg_31 can be called the 0th group, Seg_32 to Seg_63 can be called the first group, Seg_64 to Seg_95 are called the second group and Seg_96 to Seg_127 are called the third group.

Figure 10:
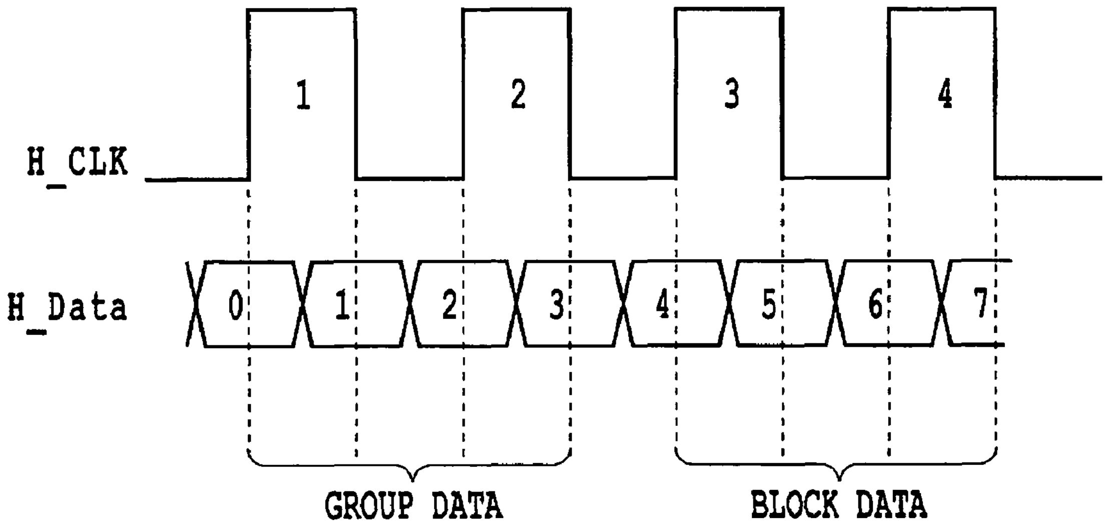
FIG. 10 is a timing chart showing a transfer clock H_CLK and head drive data H_Data to control discharging of 64 printing elements included in one discharge port array.

FIG. 10 is a timing chart showing the transfer clock H_CLK and the head drive data H_Data to control discharge of 64 printing elements included in the discharge port array L1. In this embodiment, during a period in which an H_LATCH signal generates one pulse (see FIG. 8), the transfer clock signal H_CLK generates four pulses, and the drive data H_Data is fetched at both edges of H_CLK. That is, printing elements can be designated by using eight bits, 0 to 7 in FIG. 10, of the drive data H_Data. In this embodiment, the last four bits are employed as data to represent 16 block numbers, and the first four bites are allocated, by one bit, to the 0th to the third groups. That is, when bit 1 is set, the 0th group is designated; when bit 2, bit 3 or bit 4 is set, the first group, the second group or the third group is designated. According to the above described arrangement, distributed driving for the discharge port array L1 is controlled.

Figure 11:
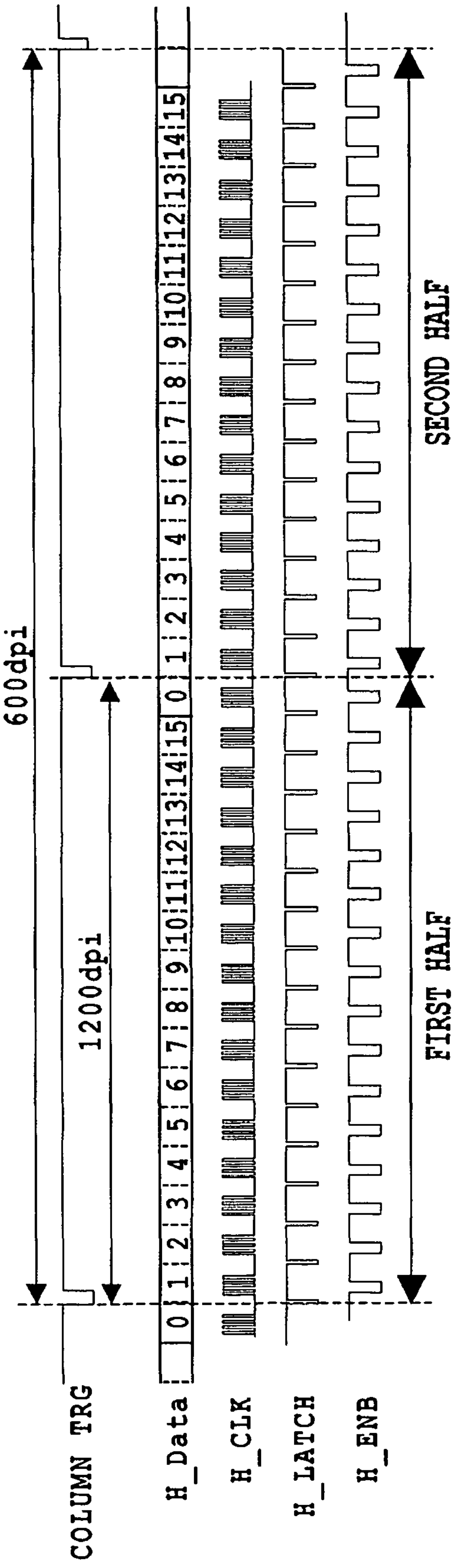
FIG. 11 is a timing chart for explaining a plurality of types of pulse signals to be transmitted to a printing head according to a first embodiment of the present invention.

FIG. 11 is a timing chart for explaining a plurality of types of pulse signals to be transmitted to the printing head in this embodiment. Since the printing head of this embodiment can perform printing at the resolution of 600 dpi in the main scanning direction, a plurality of pulse signals are also shown in one column, i.e., within a period corresponding to one pixel of 600 dpi. However, in this embodiment, unlike the conventional timing chart shown in FIG. 8, one column is divided into the first half and the second half, and a pulse generation process sequence shown in FIG. 8 is compressed to one half along the time axis, and is fitted in each half period of the column.

For the printing head of this embodiment, the printing element group described above is the minimum unit for which either the first half drive or the second half drive can be designated. Hereinafter, because of the implication of the electrical control, each printing element group is called Seg_Block, and an explanation will now be given while the 0th group to the third group correspond to Seg_Block0 to Seg_Block3, respectively. According to this embodiment, ink droplets discharged by the first half in one column are landed at positions by half a pixel ahead relative to ink droplets discharged by the second half in the same column. That is, by employing the method of the embodiment, landing positions of dots to be formed on a printing medium can be adjusted at the accuracy of 1200 dpi, which is a double of 600 dpi.

Conventionally, control methods have been employed whereby multiple discharge ports arranged in a printing head are divided into groups, and ink discharge timings are shifted in one column. However, many control methods did not employ the above described distributed driving, and were performed only for sequential driving whereby multiple discharge ports are sequentially divided into several blocks, and ink is to be discharged in order of blocks. As long as the sequential driving was performed, the inclination of the print position could be corrected, more or less, by changing the order of driving blocks or changing the driving interval.

A control method for performing the distributed driving has been also proposed. However, according to this method, generally, an H_ENB signal, which is a discharge signal, is provided for each nozzle group. When this control method is employed, an H_ENB signal line and an H_ENB control circuit must be prepared, so that drive lines for the control circuit and the printing head would be complicated and increased. Thus, since the cost and the size of the printing apparatus would be increased, this method is not realistic in order to provide a small and inexpensive printing apparatus.

On the other hand, according to the method employed for this embodiment, since an H_ENB signal line need not be provided, the current configuration need not be substantially changed to obtain the distributed driving state. Further, while the area where distributed driving is to be performed is reduced from the conventional one column to a ½ column, correction for less than one pixel can be performed in the range that is beyond the variance due to distributed driving. Therefore, more accurate correction can be performed with a comparatively simple configuration.

Furthermore, in this embodiment, a conventional method for adding an offset to print data is also employed for the print position shift of equal to or greater than one pixel. To provide this method, for example, in accordance with the number of pixels to be shifted, an offset may be added to the address of image data that are referred to when H_Data are to be transferred, or an image data delay circuit may be provided for the printing apparatus or the printing head.

A specific explanation will be given for a correction method whereby the inclination of the print position is adjusted by using the above two methods for adjusting the print positions. In the inkjet printing apparatus of this embodiment, assume that a means that adds an offset to print data to cope with a print position shift in one pixel is called a first print position adjustment means (first correction means), and that a means that switches between the first half drive and the second half drive to cope with a print position shift less than one pixel is called a second print position adjustment means (second correction means). In the first correction means, the offset of the printing data is realized by controlling a memory address where the printing data stored.

FIGS. 12A and 12B are diagrams for explaining the levels of an inclination and adjustment values correlated with the levels when the inclination of the print position of the discharge port array L1 is adjusted. In FIG. 12A, 0 to 4 along the horizontal axis are values that represent the levels of the inclination of a print position. A value of 0 indicates the state wherein correction is not required for the print position (no inclination at the print position). In this embodiment, Seg_Block described above is employed as the minimum correction unit both by the first print position adjustment means and by the second print position adjustment means.

Assume that, when the inclination level is 1, correction is not especially required for Seg_Block0 and Seg_Block1, but correction such that printing should be performed by shifting by half a pixel is required for Seg_Block2 and Seg_Block3. In this embodiment, one pixel of 1200 dpi (half a pixel of 600 dpi) is defined as one unit for correction, and the adjustment value for Seg_Block0 and Seg_Block1 is 0, while the adjustment value for Seg_Block2 and Seg_Block3 is 1.

Furthermore, when the inclination level of the print position is 4, the adjustment value of Seg_Block0, which is used as a reference, is maintained as 0, while the adjustment values of 1, 3 and 4 are required respectively for Seg_Block1, Seg_Block2 and Seg_Block3.

Further, for the printing apparatus of this embodiment, assume that information of the adjustment value can be obtained by some kind of method. To obtain the information, for example, during manufacturing a printing head, the adjustment value may be measured and written to the memory of the printing head, and the information thereof may be read from the printing head. Further, means for measuring the adjustment value may be provided inside the printing apparatus. Either way, the inkjet printing apparatus of this embodiment obtains information about the adjustment value, and employs a table shown in FIG. 12B to sort the adjustment value into a correction value by the first print position adjustment means and a correction value by the second print position adjustment means.

FIG. 12B is a diagram showing a table wherein correction values that the first print position adjustment means and the second print position adjustment means employ in order to provide the adjustment values that are correlated with the inclination levels. In FIG. 12B, the levels of the inclination of the print position along the horizontal axis and Seg_Blocks along the vertical axis correspond to those in FIG. 12A. While referring to FIG. 12A, when the inclination level is 1, the adjustment value of 1 is required for Seg_Block2 and Seg_Block3. In this case, as shown in FIG. 12B, the second print position adjustment means performs correction of 1 for Seg_Block2 and Seg_Block3. As a result, the offset is not provided for image data, and driving in the first half of a column is designated for Seg_Block0 and Seg_Block1, while driving in the second half of the column is designated for Seg_Block2 and Seg_Block3.

When the inclination level is 4, the adjustment values of 1, 3 and 4 are required respectively for Seg_Block1, Seg_Block2 and Seg_Block3. In this case, also as shown in FIG. 12B, the second print position adjustment means performs correction of 1 for Seg_Block1, the first print position adjustment means performs correction of 1 and the second print position adjustment means performs correction of 1 for Seg_Block2, and the first print position adjustment means performs correction of 2 for Seg_Block3. As a result, the offset for image data is not performed for Seg_Block0 and Seg_Block1, the offset for image data equivalent to one pixel is performed for Seg_Block2, and the offset for image data equivalent to two pixels is performed for Seg_Block3. Furthermore, driving in the first half of a column is designated for Seg_Block0 and Seg_Block3, while driving in the second half of the column is designated for Seg_Block1 and Seg_Block2 is designated.

As described above, in this embodiment, the first print position adjustment means, which performs correction using a unit equivalent to a resolution (one pixel of 600 dpi), and the second print position adjustment means, which performs fine adjustment at lower than the resolution (by an unit smaller than one pixel), are provided independently. Thus, more accurate correction of the print position is enabled with a less expensive and simpler configuration than the conventional one.

In the previous explanation, the second print position adjustment means that shifts the print position at a distance smaller than the unit of the resolution has designated either the first half drive or the second half drive in a column. However, in the embodiment, the number of segments of a column is not limited to two. One column may be divided into N areas wherein N is a greater integer than two, and each Seg_Block may be driven in a predetermined m-th (m is 1 to N) area. With this arrangement, correction can be performed more accurately.

Second Embodiment

A second embodiment of the present invention will now be described. A printing apparatus in this embodiment prints an image at a resolution of 300 dpi, and a first print position adjustment means performs correction for each pixel of 300 dpi. The arrangement in FIG. 9 is also employed for the discharge port array of a printing head and Seg_Blocks in this embodiment; however, the pitch for arranging discharge ports is equivalent to 300 dpi. In this embodiment, the conventional structure that provides different H_ENB signals for individual Seg_Blocks is employed for a second print position adjustment means.

Figure 13:
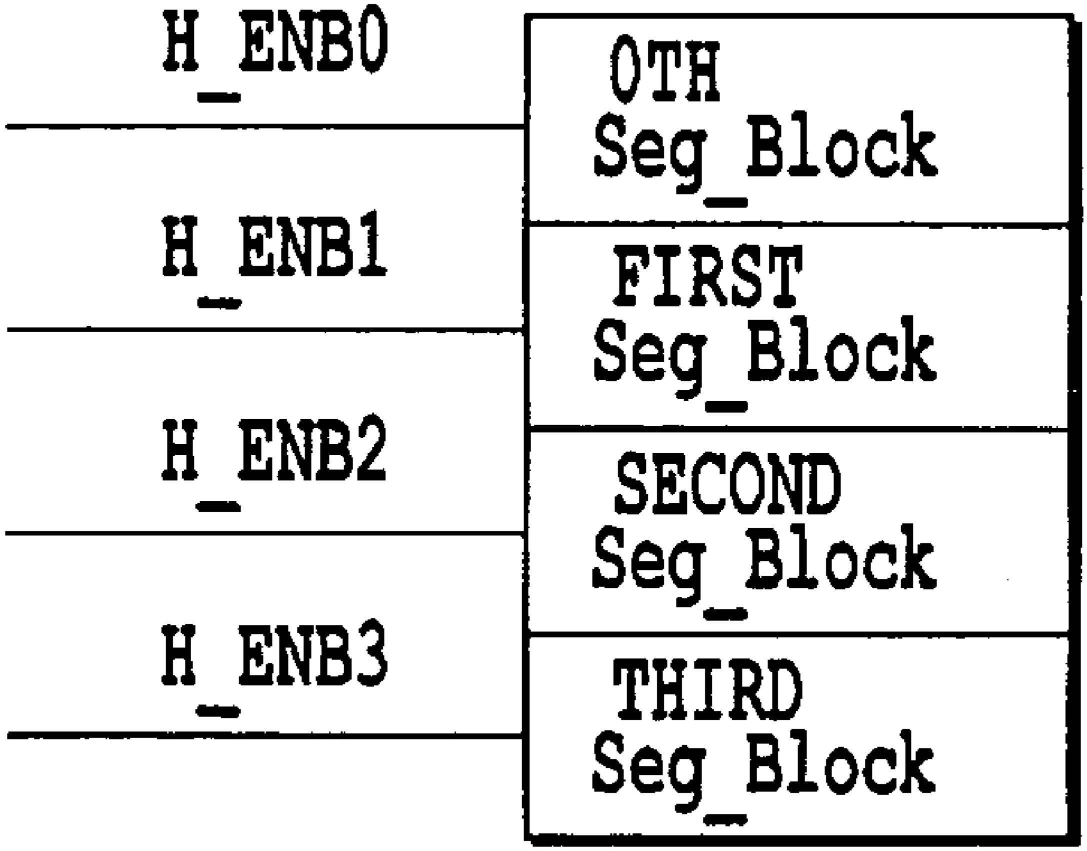
FIG. 13 is a diagram showing connections of H_ENB signals relative to Seg_Blocks according to a second embodiment of the present invention.

FIG. 13 is a diagram showing the connections of E_ENB signals to Seg_Blocks in a printing head for the embodiment. As shown in FIG. 13, independent H_ENB signals are provided for individual Seg_Blocks, and can be separately controlled. The H_ENB signals may be independently generated by the main body of the printing apparatus. Or, the connector of the printing head or a delay circuit provided in the printing head may be employed, and H_ENB signals may be generated based on H_ENB0 and a delay signal that uses H_ENB0 as a reference. In this case, a circuit and lines that are more complicated than those in the first embodiment are required; however, within the range of one column, a discharging timing can be designated under a comparatively arbitrary condition.

FIGS. 14A and 14B are diagrams for explaining inclination levels and adjustment values correlated with the levels when the inclination of the print position of a discharge port array L1 is to be adjusted in the same manner as referring to FIGS. 12A and 12B. In this embodiment, the first print position adjustment means and the second print position adjustment means also employ Seg_Block as the minimum unit.

When the level of the inclination of the print position is, for example, 2, correction is not especially required for Seg_Block0. However, correction such that printing should be performed with shifting at a distance equivalent to ¼ pixels is required for Seg_Block1 and Seg_Block2, and correction such that printing should be performed with shifting at a distance equivalent to ¾ pixels is required for Seg_Block3.

In this embodiment, one pixel of 1200 dpi (¼ pixels of 300 dpi) is defined as one unit for correction, and the adjustment value for Seg_Block0 is 0, the adjustment values for Seg_Block1 and Seg_Block2 are 1, and the adjustment value for Seg_Block3 is 2.

When the level of the inclination of the print position is, for example, 4, the adjustment value for Seg_Block0 that is a reference is maintained as 0, while the adjustment values of 1, 3 and 4 are required respectively for Seg_Block1, Seg_Block2 and Seg_Block3.

For the printing apparatus of this embodiment, assume that information of the adjustment value can be obtained by some kind of method. To obtain the information, for example, during manufacturing a printing head, the adjustment value may be measured and written to the memory of the printing head, and the information thereof may be read from the printing head. Further, means for measuring the adjustment value may be provided inside the printing apparatus. Either way, the inkjet printing apparatus of this embodiment obtains information about the adjustment value, and employs a table shown in FIG. 14B to sort the adjustment value into a correction value by the first print position adjustment means and a correction value by the second print position adjustment means.

FIG. 14B is a diagram showing a table wherein correction values that the first print position adjustment means and the second print position adjustment means employ in order to provide the adjustment value that are correlated with the inclination levels. While referring to FIG. 14A, when the inclination level is, for example, 2, the adjustment value of 1 is required for Seg_Block1 and Seg_Block2, and the adjustment value of 2 is required for Seg_Block3. In this case, as shown in FIG. 14B, the second print position adjustment means performs correction of 1 for Seg_Block1 and Seg_Block2 and performs correction of 1 for Seg_Block3. As a result, an offset is not performed for image data, and using H_ENB signals, driving with the timing being shifted equivalent to ¼ pixels is designated for Seg_Block1 and Seg_Block2, while driving with the timing being shifted equivalent to ²⁄₄ pixels is designated for Seg_Block3.

When the inclination level is 4, the adjustment values of 1, 3 and 4 are required respectively for Seg_Block1, Seg_Block2 and Seg_Block3. In this case, also as shown in FIG. 14B, the second print position adjustment means performs correction of 1 for Seg_Block1, the second print position adjustment means performs correction of 3 for Seg_Block2, and the first print position adjustment means performs correction of 1 for Seg_Block3. As a result, an offset for image data is not performed for Seg_Block0, Seg_Block1 and Seg_Block2, while an offset for image data equivalent to one pixel is performed for Seg_Block3. Further, using corresponding H_ENB signals, driving at the normal timing is designated for Seg_Block0 and Seg_Block3, driving with the timing being shifted equivalent to ¼ pixels is designated for Seg_Block1, and driving with the timing being shifted equivalent to ¾ pixels is designated for Seg_Block2.

Figure 15:
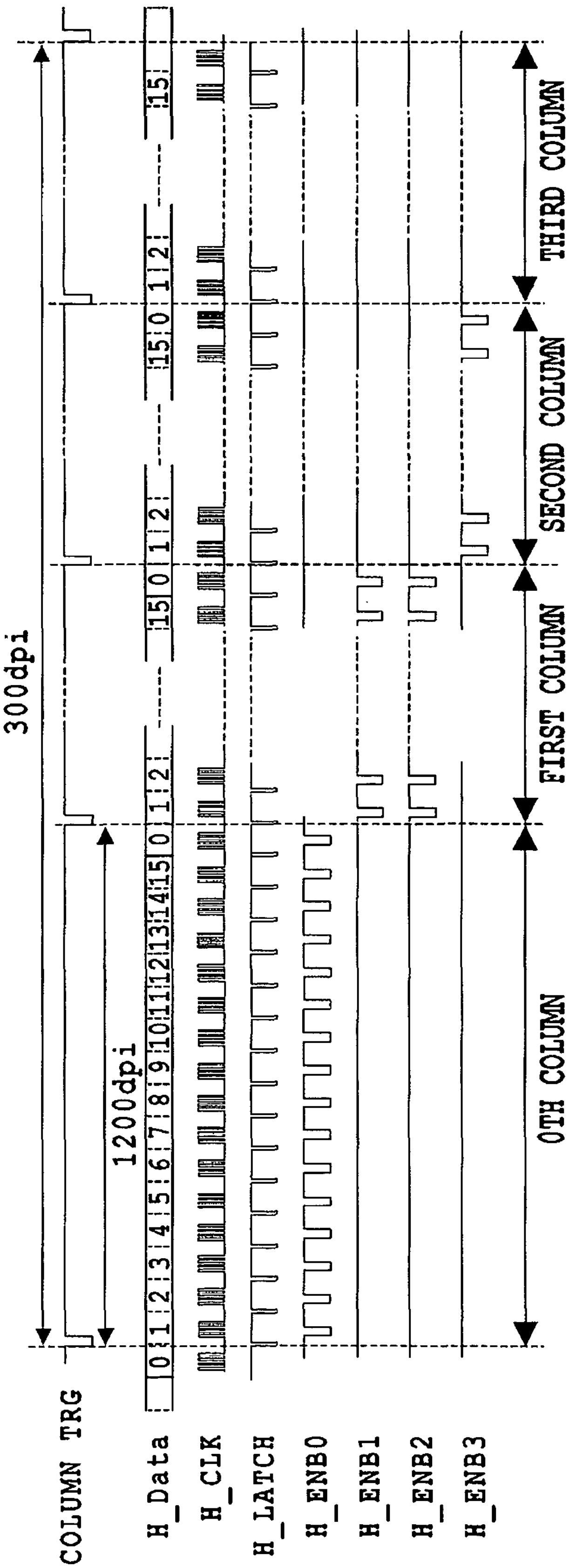
FIG. 15 is a timing chart showing a plurality of types of pulse signals to be transmitted to a printing head when the level of an inclination is two.

FIG. 15 is a timing chart showing a plurality of types of pulse signals that are to be transferred to the printing head of the embodiment when the inclination level is 2. Since the printing head can perform printing in the main scanning direction at the resolution of 300 dpi, a plurality of pulse signals are shown in one column, i.e., in a period corresponding to one pixel of 300 dpi. However, in this embodiment, unlike the first embodiment, one column area is divided into the 0th column to the third column, and the pulse generation operation is compressed by ¼ along the time axis, and is fitted in each area.

When the inclination level is 2, in H_ENB0 that corresponds to Seg_Block0, a drive pulse is generated in the 0th column, and no pulse is generated in the other columns. In H_ENB1 and H_ENB2 that correspond to Seg_Block1 and Seg_Block2, a drive pulse is generated only in the first column. Furthermore, in H_ENB3 that corresponds to Seg_Block3, a drive pulse is generated only in the third column. When this timing chart is employed, the landing positions of dots to be printed by the drive pulses that are generated in the first to the third columns are shifted, by a distance of ¼ pixels of 300 dpi (one pixel of 1200 dpi), from those of dots to be printed by the drive pulses generated in the 0th column.

In actual printing, H_Data signals corresponding to the 0th to the third columns may be generated only in the portions that correspond to each H_ENB signals. Further, the same H_Data signal may be generated in each column, and Seg_Block may be selected in accordance with the H_ENB signal.

When the multi-pass printing method described in the background art is employed for the above two embodiments, it is preferable that the distance in which a printing medium is conveyed in the sub-scanning direction before and after each scan be the integer times of Seg_Block. When the multi-pass printing is performed by using the distributed driving type printing head, the same scan line is printed by a plurality of discharge ports through different scans. Therefore, when the discharge timings differ due to distributed driving, completing relationship for each scan is insufficient, and an obstacle, such as the visual roughness, would appear on an image. So long as the conveying distance in the sub-scanning direction between scans is the integer times of Seg_Block, even when a distributed driving type printing head is employed, a plurality of discharge ports that print the same scan line belong to the same block, and discharge ink at the same timing. Therefore, printing is not adversely affected by distributed driving, and completing relationship can be satisfactorily maintained.

As described above, according to the invention, the first print position adjustment means, which performs correction using the unit equal to the resolution, and the second print position adjustment means, which performs fine adjustment at lower than the resolution, are separately provided. Thus, more accurate correction of a print position can be performed.

In order to carry out the present invention, as described in the two embodiments, it is preferable that the individual Seg_Blocks be correlated with the nozzle groups for the distributed driving process. However, the effects of the present invention can also be obtained when the Seg_Blocks and the nozzles are not correlated with each other.

In addition, in the embodiments, Seg_Blocks have been defined as the minimum correction unit used by both the first print position adjustment means and the second print position adjustment means. However, the present invention is not limited to this configuration. The characteristics of the present invention are that a means for correcting a print position at an accuracy equal to a resolution and a means for correcting a print position at an accuracy higher than a resolution are independently provided, and that, depending on a correction value, these means are employed together to adjust the print position. Therefore, so long as each correction means perform the above described functions, another arrangement is included in the scope of the invention. It should be noted, however, that, as in the embodiments, when the two means can be controlled by using the Seg_Block, the effects of the invention can be obtained with a simpler circuit and wiring configuration.

Figure 16:
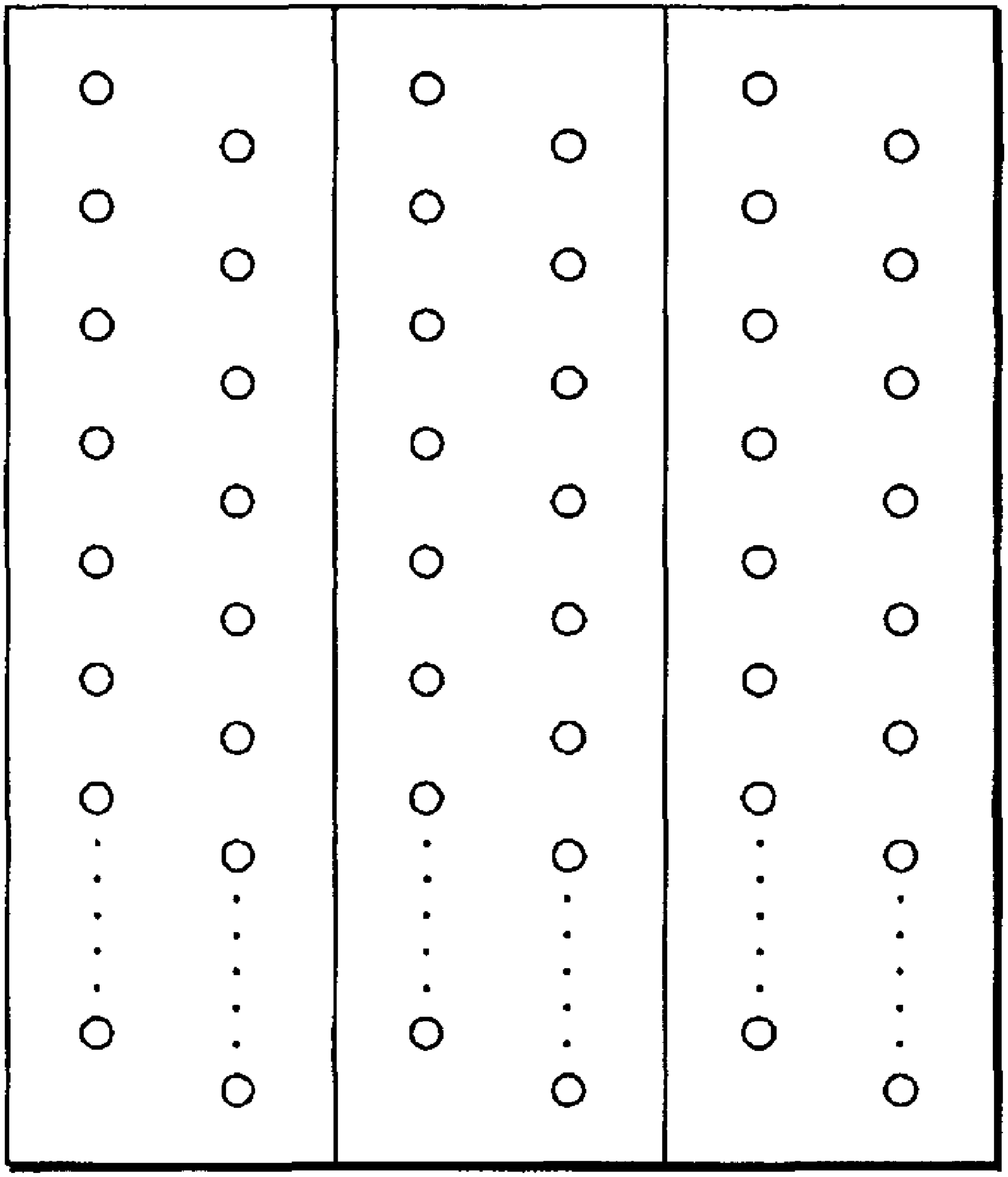
FIG. 16 is a diagram showing the state wherein printing heads, each of which includes a plurality of discharge port arrays to discharge one color ink, are arranged for multiple colors.

Furthermore, in the above embodiments, an explanation has been given for the case wherein the print position of the printing head is inclined. However, in addition to such an inclination, the present invention is also effective for a print position displacement. For example, when an image is to be formed by forward scanning and reverse scanning, the print position by forward scanning and the print position by reverse scanning may be displaced from each other. Further, when ink droplets of a single color are discharged by a plurality of discharge port arrays shown in FIG. 9, the print positions may be displaced between the discharge port arrays (L1 and L2). Further, in the structure, as shown in FIG. 16, wherein printing heads, each of which discharges one ink using a plurality of discharge port arrays, are arranged, a print position displacement between individual colors would affect a printed image.

For a common serial type printing apparatus, a print position displacement occurs due to various factors. When the configuration of the present invention is employed, the displacement in the print position that occurs in any cause can be corrected appropriately and accurately. When correction is to be performed by forward scanning and reverse scanning in the main scanning direction, the first half and the second half in the first embodiment and the order of the areas in a column in the second embodiment should be reversed between the forward scanning and the reverse scanning.

It should be noted that, in order to obtain a satisfactory image, the above described structure need not be employed for all the print position displacements. The print position displacement on an output image may be noticeable or may be not, depending on an ink color that is used, a printing medium type and a printing mode. When the above described method is employed only for a specific printing head, a specific print mode or a specific printing medium in accordance with the magnitude of the influence under a specific condition, the present invention is still effective.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

This application claims priority from Japanese Patent Application No. 2005-200145 filed Jul. 8, 2005, which is hereby incorporated by reference herein.

What is claimed is:

1. A printing apparatus that performs printing by moving a printing element array, in which a plurality of printing elements for ejecting ink to a printing medium are arranged, comprising:

driving means for driving a plurality of groups at different timings, the plurality of groups being formed by dividing the plurality of printing elements in the printing element array, with each of the groups including a plurality of continuous printing elements, wherein the driving means is able to execute driving, selectively for each group, in either a first half period or a second half period, the first half period and the second half period being established by dividing a period corresponding to one column of the printing elements;

first adjustment means configured to adjust a print position on the printing medium by one pixel unit for each of the groups by adding an offset to print data;

second adjustment means configured to adjust the print position by a unit smaller than one pixel, by selecting for each group either the first half period or the second half period for driving;

obtaining means configured to obtain inclination information of the print position when the printing element array performs printing; and setting means configured to set (i) a first adjusting value for adjusting the print position by the first adjustment means and (ii) a second adjusting value for adjusting the print position by the second adjustment means based on the inclination information, where the second adjusting value corresponds to a selection, for each group, of the first half period or the second half period for driving, wherein the driving means drives each of the groups at a timing corresponding to the print position adjusted by the first adjustment means and during the period corresponding to the second adjusting value.

2. The printing apparatus according to claim 1, wherein an image is formed by repeating a moving operation of moving the printing element array while ejecting ink, and a conveying operation of conveying the printing medium in a direction crossing the moving direction of the printing element array, and wherein in the conveying operation, a conveying distance of the printing medium is equivalent to an integer times of the length of the printing element group.

3. A print position correction method of a printing apparatus that performs printing by moving a printing element array in which a plurality of printing elements for ejecting ink to a printing medium are arranged, comprising:

a driving step of driving each of a plurality of groups at different timings, where the plurality of groups are formed by dividing the plurality of printing elements in the printing element array, with each of the groups including a plurality of continuous printing elements, wherein the driving in the driving step is executed, selectively for each group, in either a first half period or a second half period, the first half period and the second half period being established by dividing a period corresponding to one column of the printing elements;

a first adjustment step of adjusting a print position on the printing medium by one pixel unit for each of the groups by adding an offset to print data;

a second adjustment step of adjusting the print position by a unit smaller than one pixel, by selecting for each group either the first half period or the second half period for driving;

an obtaining step of obtaining inclination information of the print position when the printing element array performs printing; and a setting step of setting (i) a first adjusting value for adjusting the print position in the first correction step and (ii) a second adjusting value for adjusting the print position in the second adjustment step based on the inclination information, where the second adjusting value corresponds to a selection, for each group, of the first half period or the second half period for driving, wherein each of the groups is driven in the driving step at a timing corresponding to the print position adjusted in the first adjustment step and during the period corresponding to the second adjusting value.

4. A printing apparatus that performs printing by moving a printing element array in which a plurality of printing elements for ejecting ink to a printing medium are arranged, comprising:

a driving unit configured to drive a plurality of groups at different timings, the plurality of groups being formed by dividing the plurality of printing elements in the print element array, with each of the groups including a plurality of continuous printing elements, wherein the driving unit is able to execute driving, selectively for each group, in either a first half period or a second half period, the first half period and the second half period being established by dividing a period corresponding to one column of the printing elements;

a first adjustment unit configured to adjust a print position on the printing medium by one pixel unit for each of the groups by adding an offset to print data;

a second adjustment unit configured to adjust the print position by a unit smaller than one pixel, by selecting for each group either the first half period or the second half period for driving;

an obtaining unit configured to obtain inclination information of the print position when the printing element array performs printing; and a setting unit configured to set (i) a first adjusting value for adjusting the print position by the first adjustment unit and (ii) a second adjusting value for adjusting the print position by the second adjustment unit based on the inclination information, where the second adjusting value corresponds to a selection, for each group, of the first half period or the second half period for driving, wherein the driving unit drives each of the groups at a timing corresponding to the print position adjusted by the first adjustment unit during the period corresponding to the second adjusting value.

5. The printing apparatus according to claim 4, wherein an image is formed by repeating a moving operation of moving the printing element array while ejecting ink, and a conveying operation of conveying the printing medium in a direction crossing the moving direction of the printing element array, and wherein in the conveying operation, a conveying distance of the printing medium is equivalent to an integer times of the length of the printing element group.

* * * * *